(12) United States Patent  (10) Patent No.: US 8,276,004 B2
Wang et al.  (45) Date of Patent: Sep. 25, 2012

(54) SYSTEMS AND METHODS FOR ENERGY EFFICIENT LOAD BALANCING AT SERVER CLUSTERS

(75) Inventors: Ren Wang, Portland, OR (US); Sanjay Rungta, Phoenix, AZ (US); Tsung-Yuan Tai, Portland, OR (US); Chih-Fan Hsin, Portland, OR (US); Jr-Shian Tsai, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 355 days.

(21) Appl. No.: 12/645,333

(22) Filed: Dec. 22, 2009

(65) Prior Publication Data

US 2011/0154073 A1 Jun. 23, 2011

(51) Int. Cl.
*G06F 1/32* (2006.01)

(52) U.S. Cl. ........... 713/300; 713/1; 713/2; 713/100; 713/310; 713/320; 713/321; 713/322; 713/323; 713/324; 713/330; 713/340

(58) Field of Classification Search ......... 713/1, 2, 713/100, 300, 310, 320–324, 330, 340
See application file for complete search history.

(56) References Cited

U.S. PATENT DOCUMENTS

| | | | |
|---|---|---|---|
| 6,601,084 B1* | 7/2003 | Bhaskaran et al. | 718/105 |
| 7,243,351 B2* | 7/2007 | Kundu | 718/102 |
| 7,698,446 B2* | 4/2010 | Cafarella et al. | 709/229 |
| 7,712,103 B2* | 5/2010 | Takahisa | 718/105 |
| 2003/0046396 A1* | 3/2003 | Richter et al. | 709/226 |
| 2003/0095501 A1* | 5/2003 | Hofner et al. | 370/225 |
| 2006/0212873 A1* | 9/2006 | Takahisa | 718/105 |
| 2008/0209044 A1* | 8/2008 | Forrester | 709/226 |
| 2010/0191851 A1* | 7/2010 | Raja et al. | 709/224 |

* cited by examiner

*Primary Examiner* — M Elamin
(74) *Attorney, Agent, or Firm* — Garrett IP, LLC

(57) ABSTRACT

Methods and systems to balance the load among a set of processing units, such as servers, in a manner that allows the servers periods of low power consumption. This allows energy efficient operation of the set of processing units. Moreover, the process is adaptable to variations in systemic response times, so that systemic response times may be improved when operational conditions so dictate.

20 Claims, 8 Drawing Sheets

SYSTEMS AND METHODS FOR ENERGY EFFICIENT LOAD BALANCING AT SERVER CLUSTERS

BACKGROUND

Today data centers consume large amounts of energy, and the trend is on the rise. In a data center, a load balancer may be placed in front of a group of servers (sometimes called a server cluster) or other data processing units. The load balancer may be responsible for distributing incoming requests to multiple servers. Traditional methods, such as random or round robin load dispatching, distribute the incoming requests to active servers in a dispersed fashion. The requests may seek data, in a database context for example, or might seek computing resources in a distributed computing context, for example. In doing so, for each individual processing unit, requests arrive frequently from the load balancer, even though statistically the unit may be idle for a significant amount of time. As a result, energy may still be consumed during times when a processing unit may appear to be otherwise idle. There is latency when entering and exiting a low power state, for example, since a low power state is not entered or exited instantaneously. During this latency period, no processing is being done by the processing unit, yet it is still consuming more power than it would consume in a strictly low power (or "sleep") state. As a result, a processing unit may seldom have opportunities to go into a deep low power state. Thus data center power consumption may be excessive.

In order to achieve scalability and fast response times, normally a large number of processing units (sometimes called a cluster) may be needed to process the requests, e.g., HTTP requests. A load balancer may be located at the front end of the server cluster to perform load distribution among the active servers, for example. Load balancing may be used for many types of processing units, e.g., web servers, application servers, and database servers.

In a modern data center, not all processing units in a cluster may be active all of the time. More processing units may be brought up when incoming traffic becomes heavy; and some processing units will be shut down to save power when the traffic is light. For the active processing units, the target utilization is usually much less than 100% in order to provide good response times and reserve capacity room for sudden bursts of requests. With a target utilization of 60%, a processing unit will be idle for 40% of the time. However, how the idleness may be distributed over time has great impact on processing unit energy efficiency.

There are various schemes used to distribute the incoming requests among active processing units. Common ones include:

1) random dispatching, where requests are assigned to active processing units selected randomly by load balancer. On average, the load is evenly distributed among processing units. This scheme can be implemented by various hash functions;

2) round-robin dispatching, where the load balancer assigns the requests to active processing units on a rotating basis. This keeps the processing units equally assigned; and 3) weighted round-robin dispatching, where a weight is assigned to each processing unit in the group so higher capacity processing units service more requests. For example, the load balancer may assign two requests to a faster processing unit for each request assigned to a slower one.

The common drawback of these or related schemes, in term of energy efficiency, is that the load balancer distributes the incoming requests to active processing units in a dispersed fashion. In doing so, each individual processing unit, even though statistically idle for a significant amount of time, must handle requests that arrive frequently from the load balancer. As a result, the processing unit seldom has opportunities to go into a deep low power state. The frequent wake-ups keep the processing unit from ever going into a deep sleep state.

BRIEF DESCRIPTION OF THE DRAWINGS/FIGURES

FIG. 1 is a block diagram showing the topology of a processing unit cluster, according to an embodiment.

FIG. 2. illustrates the timing and distribution of requests to processing units in an embodiment.

Figure 1:
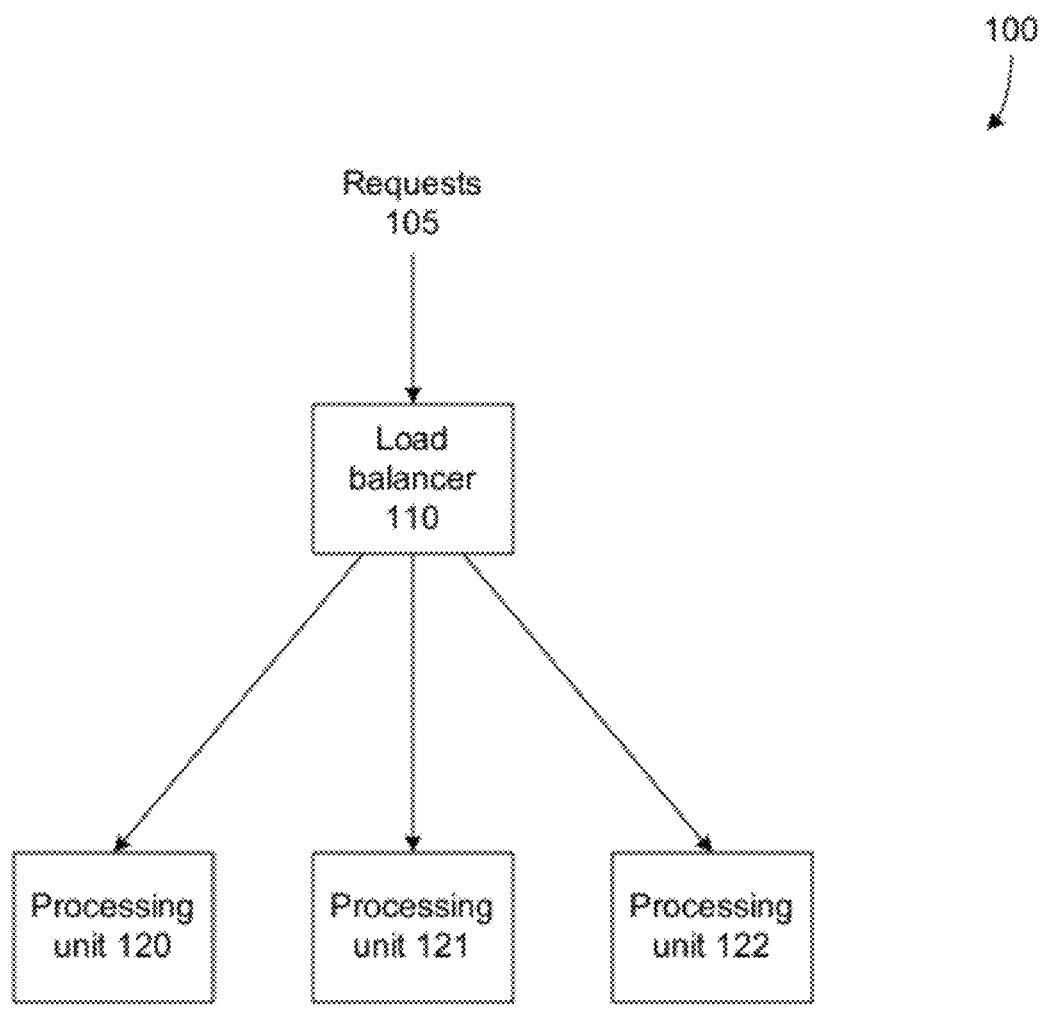

In the drawings, the leftmost digit(s) of a reference number identifies the drawing in which the reference number first appears.

DETAILED DESCRIPTION

Discussed herein are methods and systems to balance the load among a set of processing units, such as servers, in a manner that allows the processing units periods of low power. This allows energy efficient operation of the processing units. Moreover, the process may be adaptable to variations in systemic response time, so that systemic response time may be improved when operational conditions so dictate.

FIG. 1 illustrates an example of a set of processing units 120-122, such as a cluster of servers. The processing units work together to service incoming requests 105. The requests 105 are received at a load balancer 110. The load balancer then distributes the requests to the processing units in a manner described below.

Figure 2:
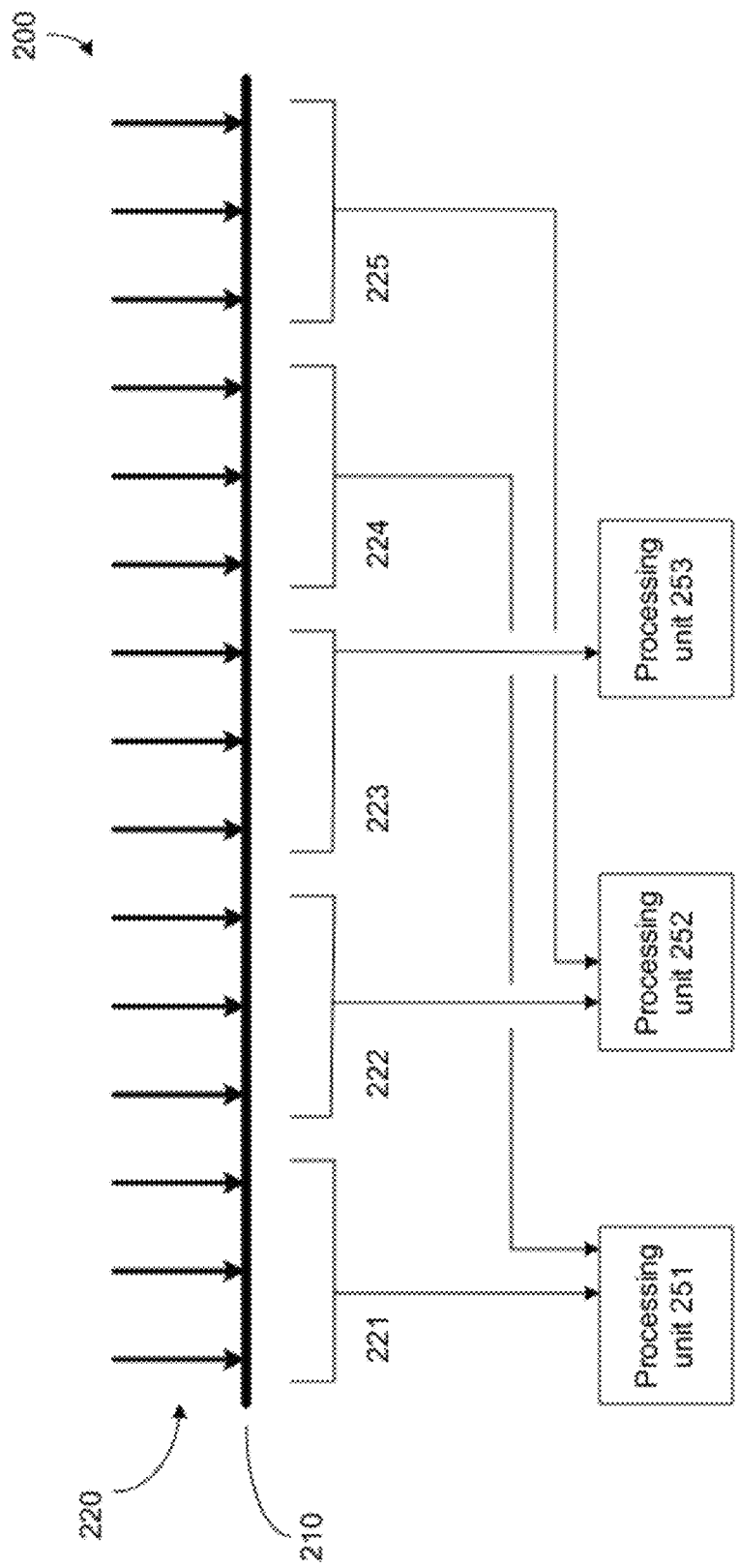

A system for balancing the load at a cluster of servers is illustrated in FIG. 2, according to an embodiment. A timeline 210 is shown, during which requests 220 may be received at a load balancer. The requests 220 may be sent to a processing unit as they arrive at a load balancer. When the number of requests sent to the particular processing unit reaches a defined batch size, subsequent requests may be sent to a next processing unit. Requests may be sent to this latter processing unit, until the number sent to this processing unit reaches the batch size. This process continues as subsequent batches of requests are sent to respective subsequent processing units. When a batch has been sent to the last processing unit, the next batch is sent to the first processing unit. Hence batches of requests are individually dispatched to processing in round robin fashion. In the example shown, the batch size is three. When the number of requests dispatched to a processing unit reaches three, the next batch of three requests may be dispatched to the next processing unit.

The first batch 221 contains three requests, and may be sent to a first processing unit 251 as they arrive at the load balancer. When the fourth request has been received, this request may be sent to the next processing unit 252. Likewise, the next two requests may be dispatched to the next processing unit 252. The second batch of three requests, batch 222, is therefore dispatched to processing unit 252 as the individual requests in this batch arrive at the load balancer. Likewise, the next batch 223 may be sent to the next processing unit 253. Given that there are three processing units in this example, the fourth batch may be sent to the first processing unit 251, and the next batch 225 may be sent to the second processing unit 252. Batches may continue to be dispatched to processing units in round robin fashion.

This arrangement allows any given processing unit to idle and enter a low power state for an extended period between processing batches of requests. For the illustrated system, a given processing unit may service a batch, then may idle while two other batches may be handled by the other processing units. Processing unit 252, for example, may handle batch 222, then may idle while batches 223 and 224 may be processed by the other units. Processing unit 252 may not need to resume operation until batch 225 is dispatched by the load balancer.

Figure 3:
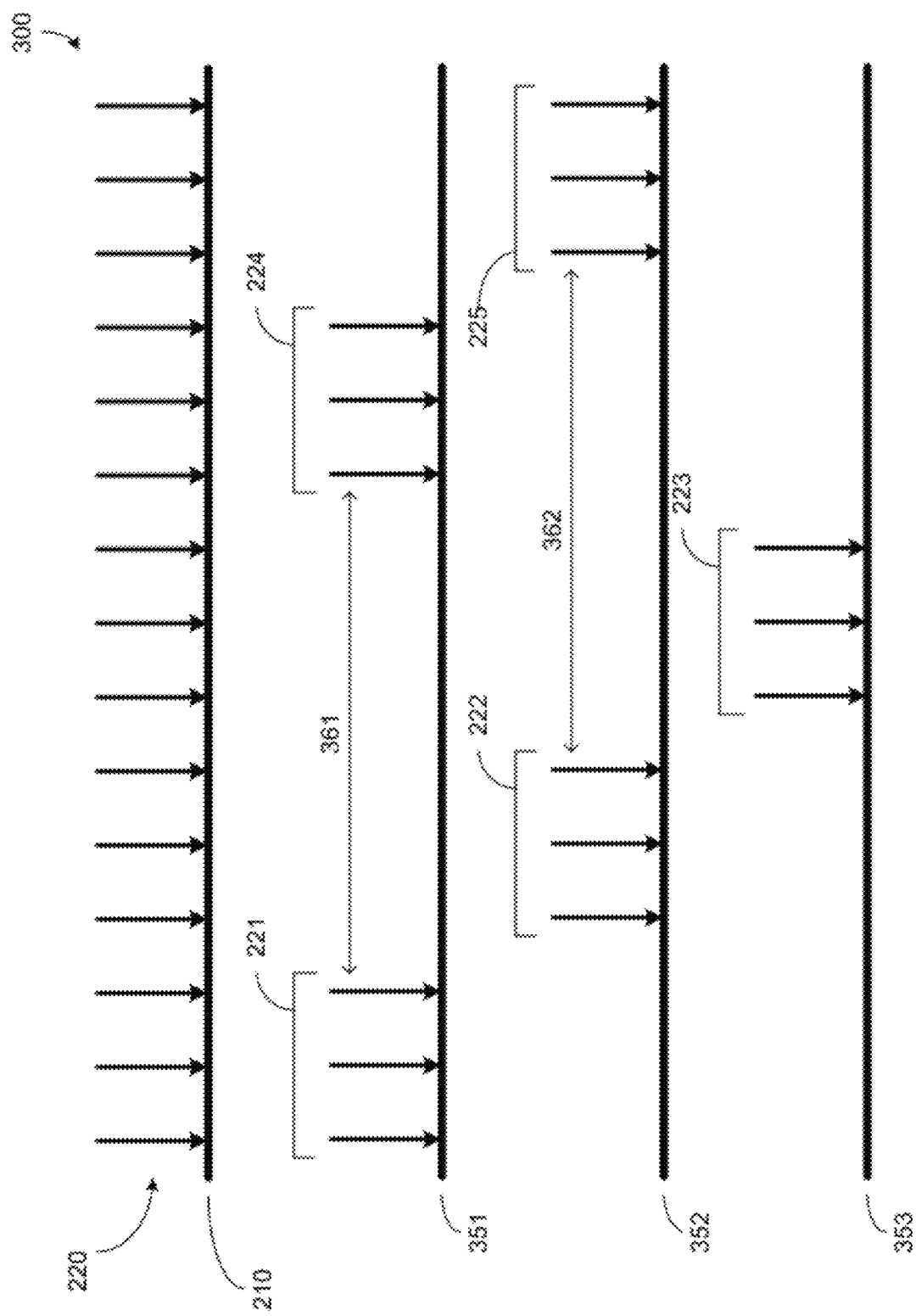
FIG. 3 illustrates the timing of batch processing and low power states in an embodiment.

In general, if there are m processing units, any given processing unit handles every m-th batch. After processing a batch, a processing unit may idle and enter a low power state while the next m−1 batches may be processed by other processing units. This is illustrated in FIG. 3. A timeline 351 illustrates the receipt of batches of requests at processing unit 251; a timeline 352 illustrates the receipt of batches of requests at processing unit 252; and a timeline 353 illustrates the receipt of batches of requests at processing unit 253. Timeline 351 includes an idle interval 361 for processing unit 251, between processing the overall first batch 221 and the overall fourth batch 224. During interval 361, batches may be handled by other processing units, so processing unit 251 may enter a low power state during this interval. Similarly, timeline 352 includes an idle interval 362 for processing unit 252, between processing the system's second batch 222 and the system's fifth batch 225.

Note that this illustration shows batches that are three requests in size. This number is for illustration purposes only, and does not represent a limitation. In alternative embodiments, batches may be of a different size. FIG. 3 also shows three processing units; in alternative embodiments, the number of processing units may be smaller or larger.

Figure 4:
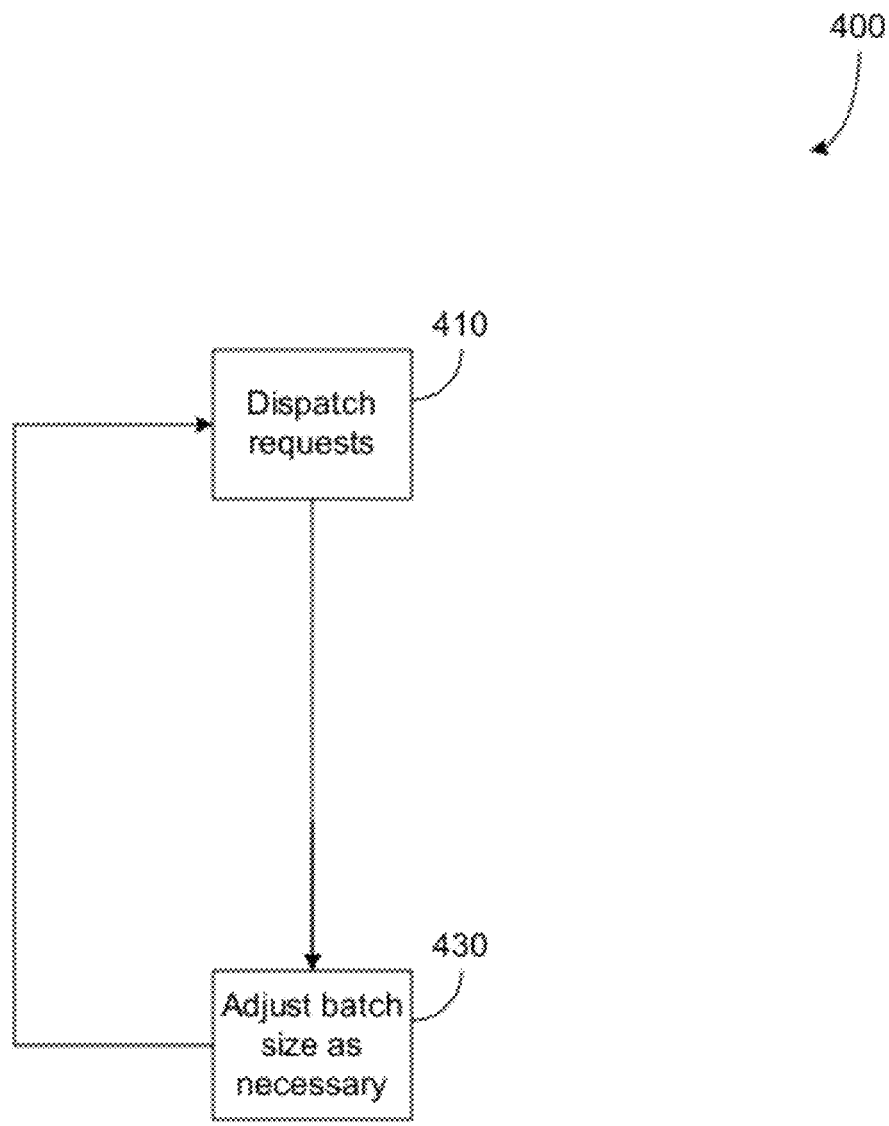
FIG. 4 is a flowchart illustrating the overall operation of an embodiment.

The processing of an embodiment is shown in FIG. 4. At 410, received requests may be dispatched to processing units as the requests are received. As discussed above, once the number of requests that have been dispatched to a processing unit reaches the batch size, the subsequent batch of requests may be sent to the next processing unit, etc. At 430, the batch size may be adjusted as necessary. The decision to alter a batch size may depend on the systemic response time for handling of requests. The systemic response time may be a function of the response times for individual requests. The response time for an individual request represents the interval from receipt of the request at the load balancer to the completion of processing of the request at a processing unit. The batch size may be altered if the systemic response time for servicing requests varies from a specified range. For example, if the systemic response time is excessive, a decision may be made to reduce the batch size. This would mean that the number of successive requests dispatched to a given processing unit is not as large. If the batch size is reduced, requests are received and dispatched to a processing unit over time at the load balancer, but the batch size would be attained more quickly. This may reduce any queuing delay at the load balancer, and therefore requests would reach a processing unit sooner. Systemic response times may therefore improve when batch size is decreased.

In another embodiment, a decision may be made to increase the batch size when such an increase does not threaten to significantly degrade systemic response time. Such a change may increase the length of idle intervals for processing units. This would allow the processing units to be in a low power state for longer periods, thus saving energy.

Figure 5:
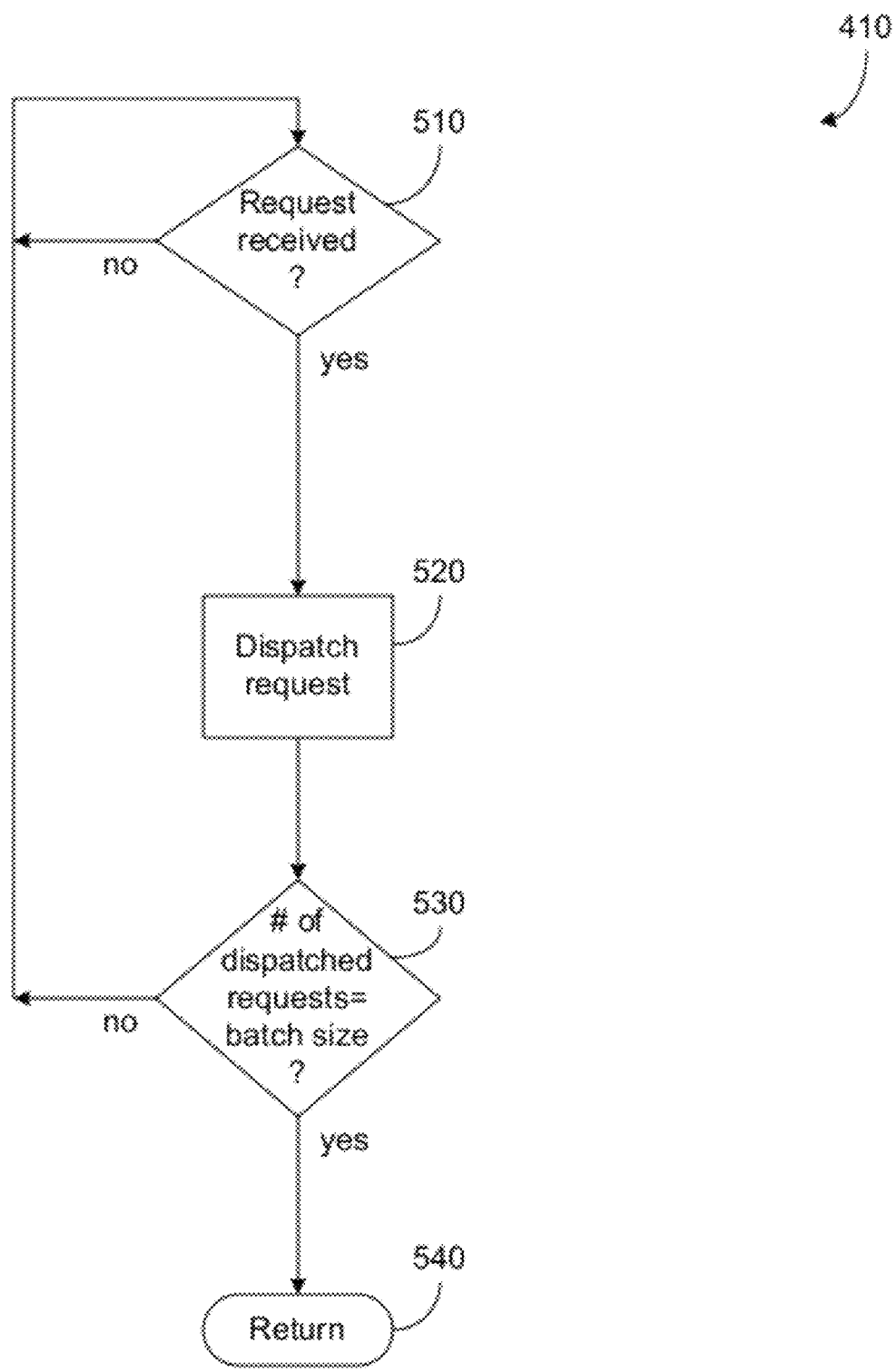
FIG. 5 is a flowchart illustrating the receiving of requests and the organization of batches, according to an embodiment.

The dispatching of requests (410 of FIG. 4) is illustrated in greater detail in FIG. 5, according to an embodiment. At 510, a determination may be made as to whether a request has been received. If not, 510 may be repeated until a request is received. When a request is received, the process may continue at 520, where the request is dispatched to a processing unit, such as a server. At 530, a determination may be made as to whether the number of requests dispatched consecutively to this processing unit has reached the batch size. If so, then the dispatching process for this batch may conclude at 540. If it is determined at 530 that the number of requests consecutively dispatched to this processing unit has not yet reached the batch size, then the process may continue at 510.

Figure 6:
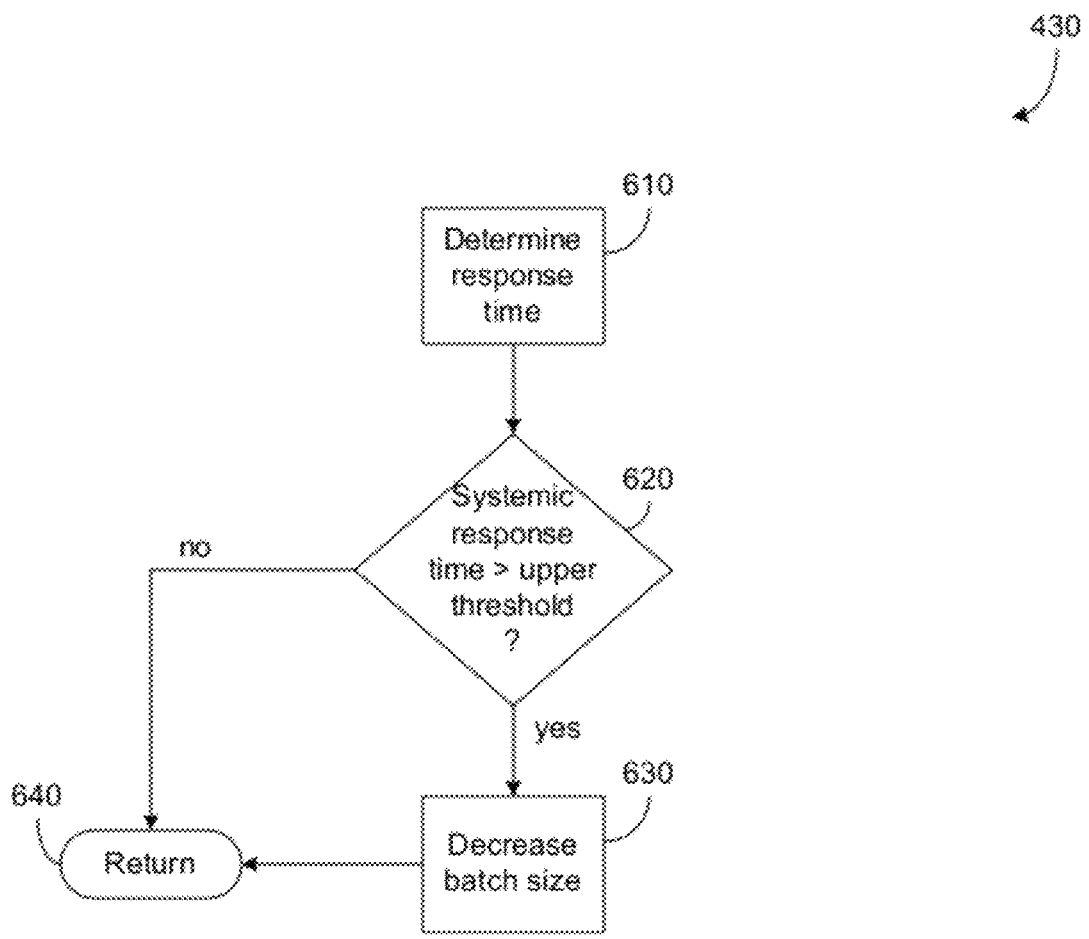
FIG. 6 is a flowchart illustrating the adaptive modification of a batch size, according to an embodiment.

The adaptive adjustment of batch size is illustrated in FIG. 6, according to an embodiment. At 610, a systemic response time may be determined. The systemic response time describes the time that may be required for a processing unit to service requests, starting from the point at which the requests are received at a load balancer. A systemic response time may therefore be a function of the lengths of time over which individual requests may be processed. The systemic response time may be calculated in any of several ways. One way would be to consider the most recent request, and determine the time required to service the request. This individual response time would then be treated as the systemic response time. Another possibility would be to consider some number of the most recent individual response and determine the mean or median of these individual response times. The number of requests that may be considered in this latter embodiment may be a predetermined value, or may be the batch size, for example. Another possibility may be to consider some or all of the requests serviced in a preceding time period, such as the last two minutes for example, and determine the mean or median of the individual response times for requests serviced in this interval. Alternatively, different functions, apart from mean and median, may be used. Note that these various ways to determine systemic response time represent different embodiments, and are not meant to limit the scope.

At 620, a determination may be made as to whether the systemic response time calculated at 610 exceeds an upper threshold. The upper threshold may represent or otherwise be related to the maximum systemic response time permitted while maintaining a desired quality of service. Exceeding this upper threshold may result in decreasing the batch size at 630 in response. If the upper threshold is not exceeded, then the process may conclude at 640.

The decrease in batch size may be fixed or variable. For example, whenever the systemic response time exceeds the upper threshold, the batch size may be decreased by a fixed amount at 630. Alternatively, the decrease may be different under different circumstances. If the systemic response time exceeds the upper threshold by a greater amount, the batch size may be decreased by a greater amount. This would allow a faster adjustment of batch size if the systemic response time increases substantially. Analogously, if the systemic response time exceeds the upper threshold by a more moderate amount, the decrease in the batch size may be more moderate. The extent to which a batch size may be adjusted may therefore be correlated to the amount by which the systemic response time varies from the acceptable range.

Figure 7:
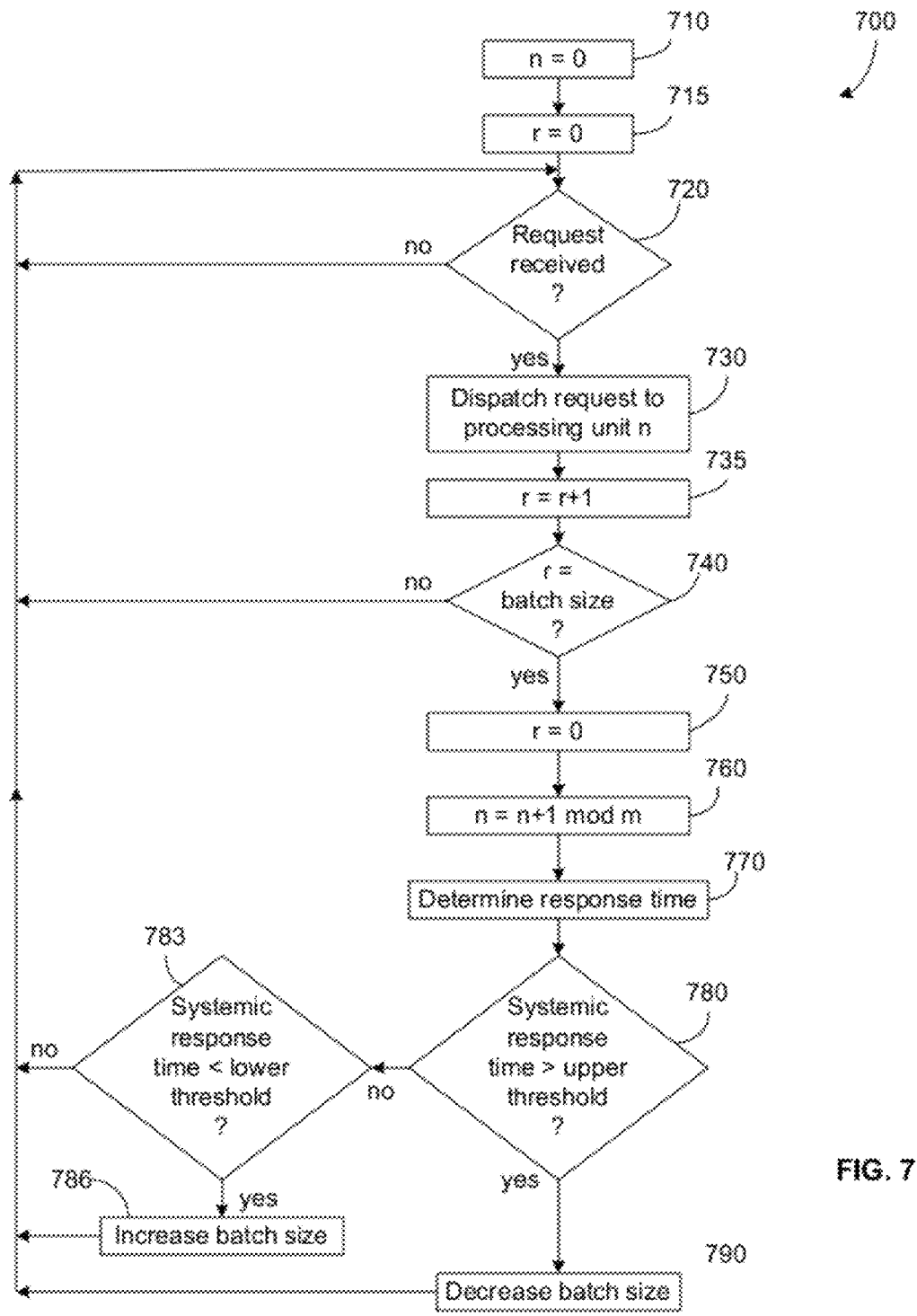
FIG. 7 is a flowchart illustrating the operation of an embodiment.

A more detailed illustration of the processing of an embodiment is provided in FIG. 7. At 710 a variable n may be initialized to zero, where n may be used to indicate the processing unit to which the next batch of requests will be dispatched. At 715, a variable r is initialized to zero, where r may be used to indicate the number of consecutive requests that have been dispatched to a particular processing unit. At 720, a determination may be made as to whether a request has been received at a load balancer. If not, 720 repeats while the process waits for a request. If a request has been received, then at 730, the request is dispatched to processing unit n.

At 735, r may be incremented by one, since the number of requests that have been consecutively dispatched to processing unit n has increased by one at 730. At 740, a determination may be made as to whether the number of requests r that have been consecutively dispatched to processing unit n is equal to the batch size. If not enough requests have been consecutively dispatched to processing unit n to constitute a batch, then the process returns to 720 to await another request. If the number of dispatched requests r is now equal to the batch size, then at 750, r may be reset to zero, because this is the number of consecutive requests that have been dispatched to the next processing unit. At 760, n may be incremented by one, modulo m, where m is equal to the number of available processing units. This allows the subsequent batch to be sent to the next processing unit (mod m). This arrangement allows any given processing unit to idle and enter a low power state for an extended period between processing batches of requests.

At 770, the systemic response time is determined as discussed above. At 780, a determination may be made as to whether the systemic response time exceeds an upper threshold. If the systemic response time exceeds the upper threshold, then in 790 the batch size may be decreased. The process may then return to 720 to await another request.

In some embodiments, the batch size may alternatively be increased when the systemic response time is sufficiently fast. By making larger batches in this case, the idle time for any given processing unit could be increased between batches, thereby reducing power consumption. This is shown at 783 and 786. If, at 780, it is determined that the systemic response time does not exceed the upper threshold, then at 783 a determination may be made as to whether the systemic response time is less than a lower threshold. If not, the systemic response time is within the upper and lower thresholds and the process may return to 720 to await another request. If the systemic response time is less than a lower threshold, then at 786 the batch size may be increased.

The system described above for management of processing units and energy consumption may be implemented in hardware, firmware, or software, or some combination thereof. In addition, any one or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Figure 8:
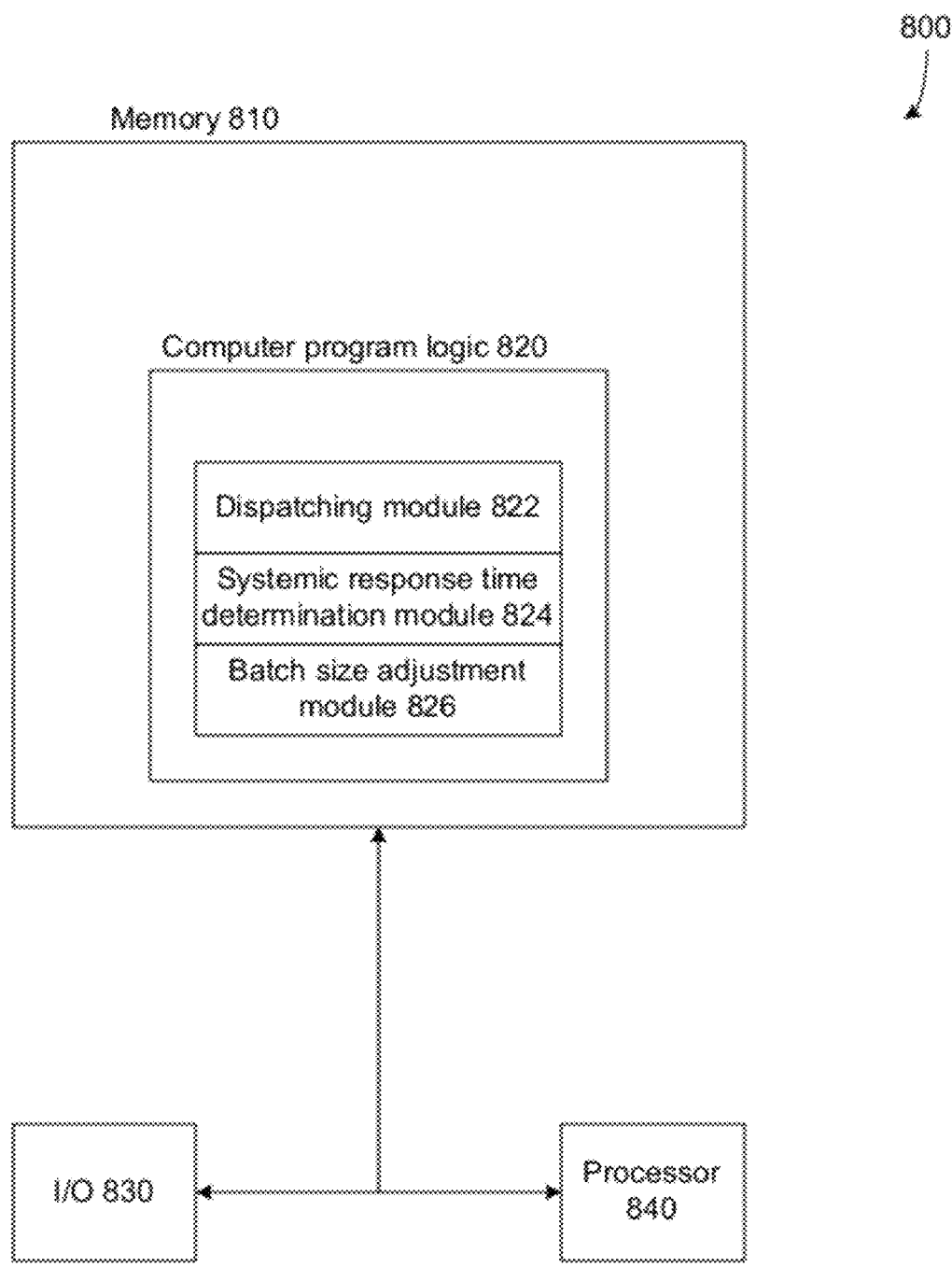
FIG. 8 is a block diagram illustrating a software or firmware embodiment.

A software or firmware embodiment of the processing described above is illustrated in FIG. 8. System 800 may include a processor 840 and a body of memory 810 that may include one or more computer readable media that stores computer program logic 820. Memory 810 may be implemented as one or more of a hard disk and drive, a removable media such as a compact disk and drive, or a read-only memory (ROM) device, for example. Processor 840 and memory 810 may be in communication using any of several technologies known to one of ordinary skill in the art, such as a bus. Logic contained in memory 810 may be read and executed by processor 840. One or more I/O ports and/or I/O devices, shown collectively as I/O 830, may also be connected to processor 840 and memory 810. In an embodiment, system 800 may be incorporated in a load balancer, such as that shown in FIG. 1.

Computer program logic 820 may include a dispatching module 822. Dispatching module 822 may be responsible for dispatching batches of received requests to respective successive processing units. Computer program logic 820 may also include a systemic response time determination module 824. Module 824 may be responsible for determining the systemic response time for the servicing of requests. As discussed above, this determination may use, as inputs, the individual response time for the most recent request, or the individual response times for a set or subset of the most recent requests. Computer program logic 820 may also include a batch size adjustment module 826, responsible for changing the batch size if the determined systemic response time goes beyond a threshold. As noted above, the batch size may be decreased if systemic response time exceeds an upper threshold. In an alternative embodiment, the batch size may also be increased if the systemic response time falls below a lower threshold. The size of the adjustment may vary, and may be correlated to the amount by which the systemic response time deviates from an acceptable range.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method, comprising:
dispatching, from a load balancer to a processing unit, consecutive requests for a processing unit service, wherein the number of consecutive requests dispatched to the processing unit represents a batch having a size equal to a batch size, and subsequent batches of requests are grouped by batch size and dispatched to successive respective processing units in round robin fashion one batch size per processing unit, wherein processing units that are not processing a batch enter a low power state;
monitoring a systemic response time for servicing of the requests; and
when the systemic response time varies from an acceptable range, modifying the batch size for a subsequent dispatching.

2. The method of claim 1, wherein said processing units comprise servers.

3. The method of claim 1, wherein said variation of the systemic response time from the acceptable range comprises the systemic response time exceeding an upper threshold.

4. The method of claim 3, wherein said modification of the batch size comprises decreasing the batch size.

5. The method of claim 4, wherein the batch size is decreased to an extent correlated with an amount by which the systemic response time exceeds the upper threshold.

6. The method of claim 1, wherein said variation of the systemic response time from the acceptable range comprises the systemic response time falling below a lower threshold, and said modification of the batch size comprises increasing the batch size.

7. A computer program product including a non-transitory computer readable medium having computer program logic stored therein, the computer program logic including:
   logic to cause a processor to dispatch, from a load balancer to a processing unit, consecutive requests for a processing unit service, wherein the number of consecutive requests dispatched to the processing unit represents a batch having a size that equals a batch size, and to further cause the processor to dispatch subsequent batches of requests grouped by batch size to successive respective processing units in round robin fashion one batch size per processing unit, wherein processing units that are not processing a batch enter a low power state;
   logic to cause the processor to monitor a systemic response time for servicing of the requests; and
   logic to cause the processor to modify the batch size for subsequent dispatching, when the systemic response time varies from an acceptable range.

8. The computer program product of claim 7, wherein the processing units comprise servers.

9. The computer program product of claim 7, wherein the variation of the systemic response time from the acceptable range comprises the systemic response time exceeding an upper threshold.

10. The computer program product of claim 9, wherein the modification of the batch size comprises decreasing the batch size.

11. The computer program product of claim 10, wherein the batch size is decreased to an extent correlated with an amount by which the systemic response time exceeds the upper threshold.

12. The computer program product of claim 7, wherein the variation of the systemic response time from the acceptable range comprises the systemic response time falling below a lower threshold, and the modification of the batch size comprises increasing the batch size.

13. A system, comprising:
   a processor; and
   a memory in communication with said processor, wherein the memory stores a plurality of processing instructions configured to direct said processor to
     dispatch, from a load balancer to a processing unit, consecutive requests for a processing unit service, wherein the number of consecutive requests dispatched to the processing unit represents a batch having a size equal to a batch size, and subsequent batches of requests are grouped by batch size and are dispatched to successive respective processing units in round robin fashion one batch size per processing unit, wherein processing units that are not processing a batch enter a low power state;
     monitor a systemic response time for servicing of the requests; and
     modify the batch size for subsequent dispatching when the systemic response time varies from an acceptable range.

14. The system of claim 13, wherein the processing units comprise servers.

15. The system of claim 13, wherein the variation of the systemic response time from the acceptable range comprises the systemic response time exceeding an upper threshold.

16. The system of claim 15, wherein the modification of the batch size comprises decreasing the batch size.

17. The system of claim 16, wherein the batch size is decreased to an extent correlated with an amount by which the systemic response time exceeds the upper threshold.

18. The system of claim 13, wherein the variation of the systemic response time from the acceptable range comprises the systemic response time falling below a lower threshold, and the modification of the batch size comprises increasing the batch size.

19. The method of claim 1, further comprising:
   between monitoring and modifying, determining the systemic response time as a time required to service one of the service requests; and
   when the determined systemic response time varies from an acceptable range, modifying the batch size for subsequent dispatching.

20. The method of claim 1, wherein the batch size is greater than or equal to one.

* * * * *